July 25, 1961  A. HUET  2,993,480
TUBULAR EVAPORATOR

Filed July 18, 1958  2 Sheets-Sheet 1

INVENTOR.
ANDRÉ HUET
BY
ATTORNEY

July 25, 1961        A. HUET        2,993,480

TUBULAR EVAPORATOR

Filed July 18, 1958        2 Sheets-Sheet 2

INVENTOR.
ANDRÉ HUET

BY *Robert E. Burns*

ATTORNEY.

United States Patent Office 2,993,480
Patented July 25, 1961

2,993,480
TUBULAR EVAPORATOR
André Huet, 48 Ave. du President Wilson, Paris 16, France
Filed July 18, 1958, Ser. No. 749,505
Claims priority, application France July 31, 1957
6 Claims. (Cl. 122—34)

The present invention has for its object a tubular evaporator which constitutes a device intended to separate a gas or a vapor from a liquid, particularly to separate steam from boiling water, and it is especially designed to avoid local over-heating and consequently the corrusion of, or the mechanical or chemical action on, the surfaces of the heat exchanger and of the separator in that a gyratory movement is created which causes a tangential pull for instance on the evaporation bubbles. This separator is particularly suited for boilers consisting of evaporator pipes which have no horizontal water level and in which the evaporator section of the boiler is formed by evaporator pipes through which flows the water/vapor mixture brought to a boil by an external fluid.

According to the present invention, the separator device arranged in the interior of the evaporator pipe is composed substantially of a helical surface which has the effect of imparting to the water/vapor mixture, a gyratory movement which ensures the separation of water, thrown outwardly by centrifugal force, from vapor which rises in the axial region of the device. The cylinder wall is pierced, between the volutions of the helix, by gaps through which vapor escapes to enter the cylinder interior, and from there to proceed to its working location.

The gaps provided on the cylindrical separator wall between the volutions of the helix have lips which may be inclined in a direction contrary to that of water/vapor mixture rotation, in order the better to intercept the vapor and to direct it towards the axis of the device.

These gaps may be replaced by tubules the apertures of which can also point in the direction opposite that of the mixture rotation.

In a modification, the separator device contains an internal helical partition which, in longitudinal section, is of truncated-cone shape and is obtained by the helical coiling of a metal band in such a way that inside the central duct a succession of nozzles is created which are capable of directing the vapor towards the upper separator region by suction, however the inclination of the device relatively to the vertical may be varied.

According to still another feature of the invention, the entire separator device may consist of a suitably formed coiled metal band the longitudinal section of which is of truncated-cone shape and has a base of disc-like formation, in which case each volution has the appearance of the crown of a hat.

The water still subsisting downstream of the separator is wholly or partially re-directed, by means of a small feedback tube, to the water/vapor circuit upstream of the separator.

The following description, with reference to the annexed drawings which are given only by way of example, will make it easier to understand how the invention can be put into practical effect.

Figure 5:
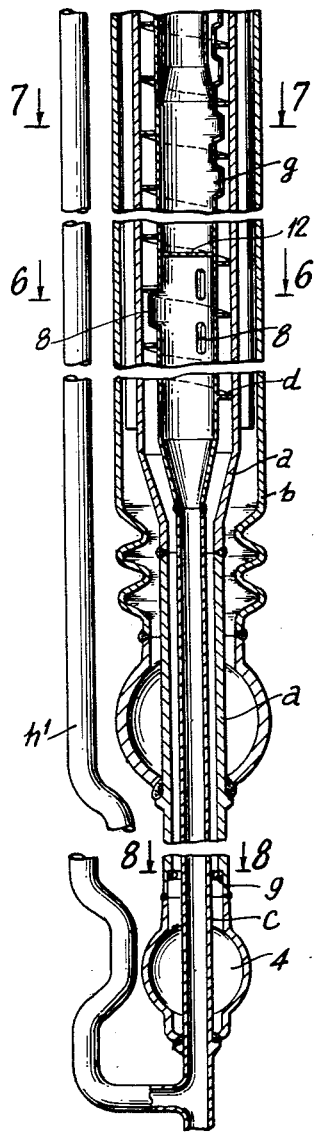
FIG. 5 shows a section of the lower part of the evaporator pipe.
Figure 7:
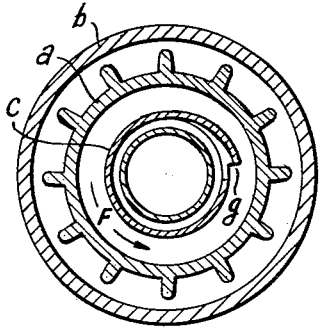
Figure 6:
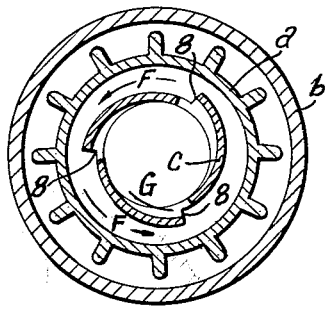

FIGS. 6 and 7 are sections of FIG. 5 along the lines 6—6 and 7—7 respectively.

Figure 8:
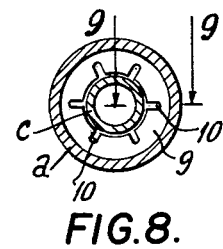

FIG. 8 shows, on a larger scale, the collar which regulates the admission of water to the lower section of the device, as seen along section line 8—8 of FIG. 5.

Figure 9:
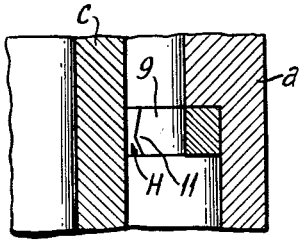

FIG. 9 is a section along the line 9—9 of FIG. 8.

Figure 10:
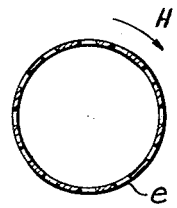

FIG. 10 is a sectional view of the separator tube showing the arrangement of the gaps.

Figure 11:
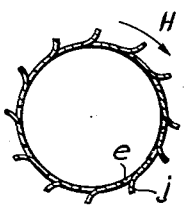

FIG. 11 is a view similar to FIG. 10 of a modified construction.

Figure 12:
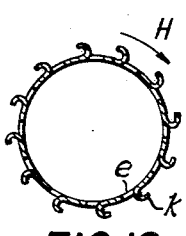

FIG. 12 is a corresponding view of another modified construction; and

Figure 13:
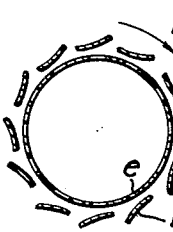

FIG. 13 shows a further modified form.

The tubular evaporator in which the separator which forms the object of the present invention can be arranged, is constituted by a pipe $a$ which may for example be cylindrical and is traversed, from bottom to top by a mixture of water and steam. Moreover, hot fluid can circulate within a concentrically arranged pipe $b$ which envelops the evaporator pipe $a$.

Figure 1:
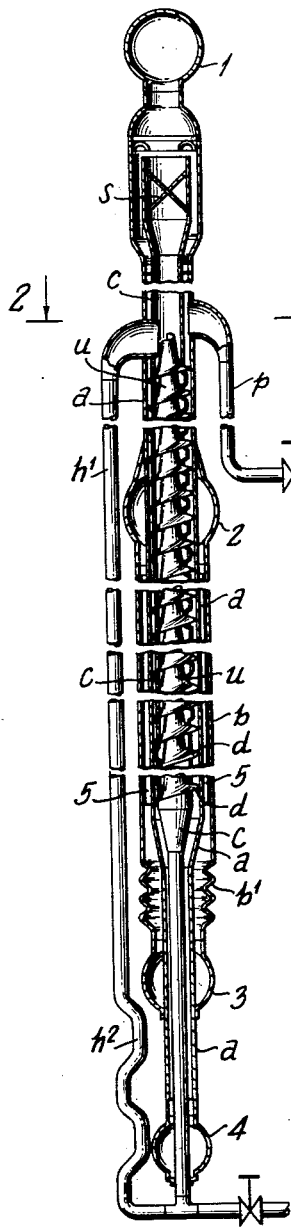
FIG. 1 shows in diagrammatic representation a longitudinal section of an evaporator pipe fitted with a separator device such as is the object of the present invention.

According to the invention, the separator device placed inside the evaporator pipe $a$ is constituted substantially by an axially arranged hollow body $c$ which on its outer surface has a helically rolled sheet metal band $d$ of constant or progressively varying pitch. The volutions of this helix can be arranged in an inclined position relatively to a plane perpendicular to the axis of cylinder $c$, i.e. as shown in FIG. 1, and this can be done in a constant or a progressively decreasing degree in such a way that funnel-like volutions are formed in which the opening is directed either downstream or upstream. This helix $d$ has the effect of imparting to the water/vapor mixture circulating a rotary motion, and the centrifugal force acting on the water throws it outwardly while the steam rises nearer to the axis of the device.

Between the various volutions of the helix $d$ are provided the gaps $e$ in the wall of the body $c$, such gaps allowing the steam to pass into the interior of the body $c$.

The gaps $e$ provided in the body of the separator $c$ may either be simple gaps as shown in FIG. 10, or the wall of the body $c$ may be slightly raised at $j$, as shown in FIG. 11, so as to heighten the outward projection of the water/vapor mixture which circulates in the direction of the arrow H, whereby only steam passes through the gaps $e$. The lips $j$ may be turned back in the shape of gutters $k$, as shown in FIG. 12, in order the better to ensure the interception and separation of water. Finally, it is also possible to arrange small deflecting surfaces $l$, as seen in FIG. 13, at the height of the gaps $e$ each of which extends over the entire height of a gap and has the effect of deviating the water outwardly by forming, together with the wall of body $c$, a kind of Venturi tube at the level of gaps $e$, and of perfecting the separation effect.

In FIG. 1 the evaporation boiler pipe as mentioned, is shown as consisting substantially of the cylindrical pipe $a$ inside of which is arranged the helical surface $d$ coiled round the inner cylindrical body $c$. The water to be vaporized arrives in the lower portion through the main denoted by 4, in the space comprised between the pipes $a$ and $c$ in which the helix $d$ is situated.

The gyration of the mixture causes the separation of steam and water, the steam rising in the axial region of the pipe $c$ where it is canalized through the entire height of the device by the tubular truncated-cone structures $u$ terminating inside one another and from where it proceeds eventually to a final steam/water separator $s$ provided in the upper portion. From there the steam is finally collected in the upper main at 1.

The hot fluid intended to transform water into steam arrives in the top section through the main 2 to which is connected the tubular envelope $b$ which surrounds the whole device and, in the lower section, communicates with the main 3 which serves for the evacuation to the hot fluid.

Said pipe $b$ is corrugated at $b^1$ along a certain part of its height so as to absorb the forces due to expansion differences occurring between the pipe $b$ and the inner pipe $a$, and to avoid transmission of such forces to the welding joints with mains 2 and 3.

Neither of these pipes $a$ and $b$ should have weak points which would tend to deteriorate under the influence of the above-mentioned forces, and this implies a certain minimum thickness for any given diameter in these pipes.

In the upper portion of this device, water still subsisting in the water/vapor mixture which rotates between the pipes $a$ and $c$ is re-directed through the tube $h^1$, which is wave-shaped at its base portion at $h^2$, to the lower part of the device, in order to be re-circulated, i.e. to be led back into the pipe $c$ from where it passes through apertures 8 provided in pipe $c$, outwardly into the space comprised between the pipes $a$ and $c$ where the helical slope $d$ is situated. The lower portion of the device thus functions as an economizer, and vaporization commences only at a certain height in the pipe interior. The water/vapor mixture rotates under the influence of the helical slopes $d$. In the top section which acts as a superheater, part of the still subsisting water may be withdrawn, instead of being recirculated, through a tangential aperture into which terminates the tube $p$, the latter being provided with a valve permitting evacuation of such water (FIG. 2).

Figure 2:
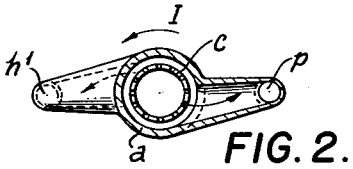
FIG. 2 shows a section along the line 2—2 of FIG. 1, on an enlarged scale.
Figure 1A:
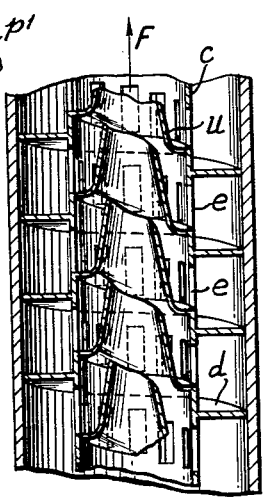
FIG. 1A is an enlarged view of a central portion of the device shown in FIG. 1.

The re-circulating and evacuation tubes, $h^1$ and $p$ respectively, communicate with the space separating the pipes $a$ and $c$ through tangential apertures suitably displaced in height, as shown in FIG. 2, so that the gyratory movement of the water (in the direction of the arrow I) can facilitate evacuation of this water towards the tubes $h^1$ and $p$.

Figure 4:
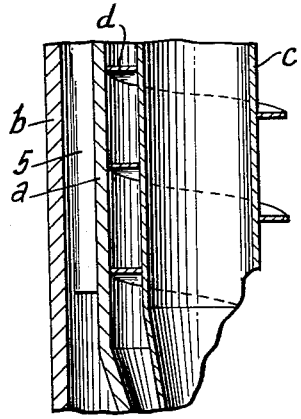
FIG. 4 is a section, on an enlarged scale, of a portion of the pipes shown in FIG. 1.

Another improvement of the device consists in arranging externally on the pipe $a$ longitudinal diametrically extending fins 5 which may be corrugated, said fins augmenting the surface available for the exchange of heat between the pipe $a$ and the hot fluid circulating in the space between the pipes $a$ and $b$ over the vertical distance which separates the main 2 from the main 3 (FIG. 4).

Figure 3:
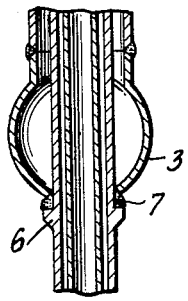
FIG. 3 shows in section, on an enlarged scale, the connection of the pipes with the lower main which gathers the outgoing hot fluid.

As can be seen in FIG. 3, the pipe $a$ in the lower section passes through the main 3 which serves for the evacuation of the hot fluid, and a bead 6, provided on pipe $a$, permits the welding together of pipe $a$ and the main 3. The same arrangement is adopted in the upper section where the pipe $a$ passes through the feeder main 2 for the hot fluid.

As shown in FIG. 5, the tube $h^1$ which allows the water to be re-circulated, terminates in the lower portion of the pipe $c$ which latter rises in the evaporator pipe and, on its outer surface, is provided with the helical slope $d$.

Pipe $c$ is closed in its lower part at 12, and apertures 8 are provided below this point in the pipe $c$, in order to establish communication in this region with the space comprised between the pipes $c$ and $a$ where the helical slope $d$ is arranged. These apertures 8 are so formed, in a manner shown in cross-section in FIG. 6, that the water or the water/vapor mixture circulating in the direction of arrow F in the space comprised between the tubes $a$ and $c$ causes, through suction, a movement of the re-circulated water which issues from the apertures 8, in the direction indicated by arrow G. Consequently, the greater the supply of water circulating in the direction of arrow F, the greater the suction which acts on the orifices 8, and the greater the amount of water which is then re-circulated. The device is, in other words, self-regulating since it sucks in a greater amount of water as the output of steam increases.

It will be seen that the lips of the aperture 8 point in a direction opposed to that of the flaps $j^1$ of gaps $g$ (FIG. 7) which in the evaporator section of the pipe $c$ are directed so as to oppose the gyratory motion F of the water/vapor mixture and intercept the steam in the water/vapor mixture, as has been explained previously.

The device provides for the dosage of the water fed to the base of the evaporator pipe $a$. This water arrives through the main 4 from which it rises in the space comprised between the pipes $c$ and $a$. This space is calibrated by a disc 9 in which radial slots 10 are provided (FIG. 8) through which the water passes.

FIG. 9 shows, in a longitudinal section, the profile 11 of the end portion of said slots 10 which has the shape of a Venturi device so that the water rising in the direction of the arrow H is injected in the space comprised between the two pipes $c$ and $a$.

The assembly can be employed for the separation of vapor from a liquid which is vaporized either under the influence of a pressure variation or by being mixed with another fluid.

The liquid can be under pressure prior to being introduced into the separator, and it will then be its expansion in the separator assembly which causes its vaporization, the device according to the invention separating the resulting vapor from the liquid. Also, the liquid may be under ordinary pressure, when a pressure decrease created in the separator assembly will cause its vaporization.

It is also contemplated that the liquid entering the assembly be mixed there with a vapor or another liquid, in which case the mixture causes a vaporization of the first liquid alone or of the whole mixture, the separator here, too, having the task of separating the vapor obtained.

These applications allow the separator to be utilized not only as a boiler without liquid level for the separation of steam from boiling water, but also as a carburetor or injector, for example to mix two liquids, such as liquid oxygen and gasoline, and to obtain a combustible vapor, in the same way as has been done in rocket motors. Thus, it is also feasible to utilize the separator in such a way as to create a carburetor used for the vaporization by heat or by expansion of compressed gasoline in an internal combustion engine.

In a more general sense, the separator can be used as a carburetor to vaporize or to mix two fluids one of which may be gaseous while the other is gasified in the assembly.

In all these cases, the advantage of the separator rests in the fact that no liquid level is established in the assembly so that the latter can function in any position.

What I claim is:

1. A tubular evaporator for simultaneously vaporizing water and separating the evolved vapor from the water comprising, in combination, a vertical evaporator pipe, a vertical cylindrical body disposed axially in said evaporator pipe and leaving an annular space therebetween, a helical structure disposed in the annular space between the cylindrical body and the evaporator pipe having convolutions to impart a gyratory motion to the fluid circulating in said space, said helical structure being extended throughout said annular space to compel the fluid in contact with the helical structure to follow its convolutions, means to admit water under pressure at the base of said annular space, whereby said water flows upwardly through said annular space, the portions of the wall of the cylindrical body lying between the convolutions of the helical structure being formed with openings to permit the escape of vapor formed in the annular space towards the interior of the cylindrical body, a partition disposed in said cylindrical body adapted to create a sequence of units of truncated-cone shape in the longitudinal direction to form nozzles to direct the vapor towards the top irrespective of the inclination of the device relatively to the vertical, a second pipe disposed concentrically around said evaporator pipe, said second pipe defining an annular space around said evaporator pipe adapted for the circulation of heating fluid, and means for collecting vapor formed at the top of the cylindrical body.

2. Tubular evaporator as defined in claim 1 wherein the edges of the openings in the wall of the cylindrical body are curved outwardly.

3. Tubular evaporator as defined in claim 1 wherein the wall of the cylindrical body adjacent said openings is formed with lips inclined counter to the gyratory direction of the fluid circulating around said cylindrical body.

4. Tubular evaporator as defined in claim 1 further comprising a pipe to recirculate the water in the water-vapor mixture at the top of the cylindrical body, said pipe being provided at the top of the cylindrical body and leading to the base of said cylindrical body for mixing the recirculated water with the water admitted in the annular pace between the cylindrical body and the evaporator pipe.

5. Tubular evaporator as defined in claim 1 further comprising a pipe to recirculate the water in the water-vapor mixture at the top of the cylindrical body, said pipe being provided at the top of the cylindrical body and leading to the base of said cylindrical body for mixing the recirculated water with the water admitted in the annular space between the cylindrical body and the evaporator pipe, a calibration disc provided with slots disposed at the base of the annular space between the cylindrical body and the evaporator pipe and above the means to admit water under pressure to said space to calibrate the admission of water.

6. A tubular evaporator as defined in claim 1 wherein said partition is helical.

References Cited in the file of this patent

UNITED STATES PATENTS

| | | |
|---|---|---|
| 223,403 | Stewart | Jan. 6, 1880 |
| 1,170,834 | Lovekin | Feb. 8, 1916 |
| 2,016,746 | Ireland | Oct. 8, 1935 |
| 2,546,381 | Zahn | Mar. 27, 1951 |

FOREIGN PATENTS

| | | |
|---|---|---|
| 460,198 | Canada | Oct. 11, 1949 |
| 15,523 | Norway | Sept. 3, 1906 |